E. V. SWERN.
STARTING DEVICE FOR EXPLOSIVE ENGINES.
APPLICATION FILED MAR. 1, 1911.
1,026,374.
Patented May 14, 1912.
2 SHEETS—SHEET 1.
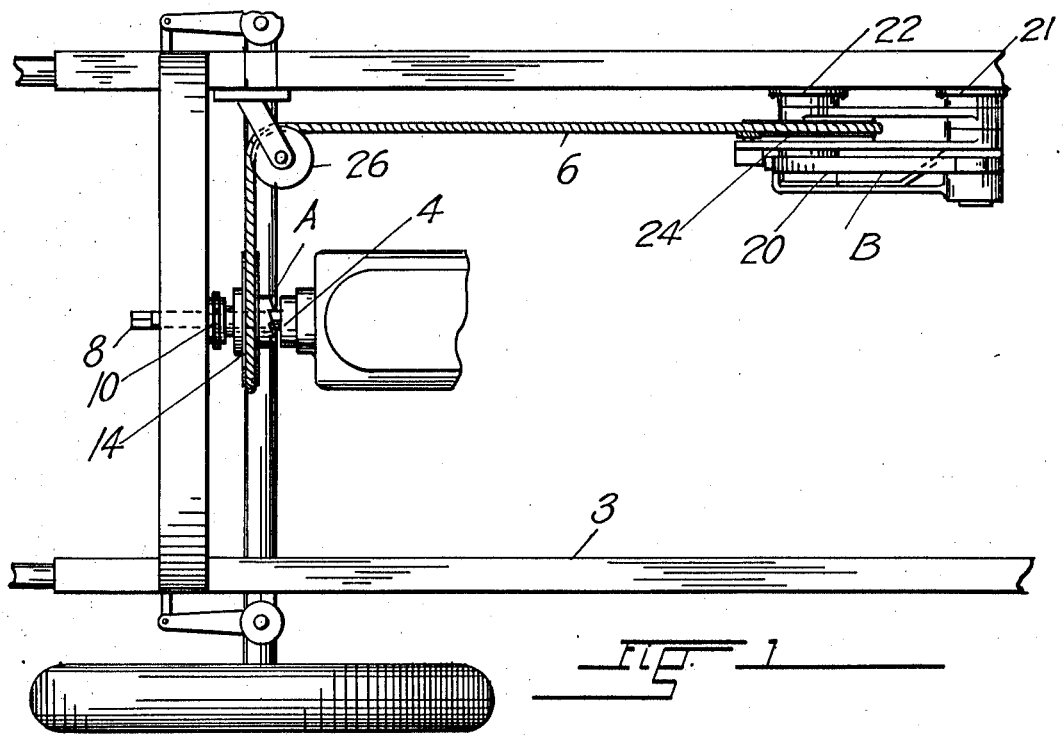
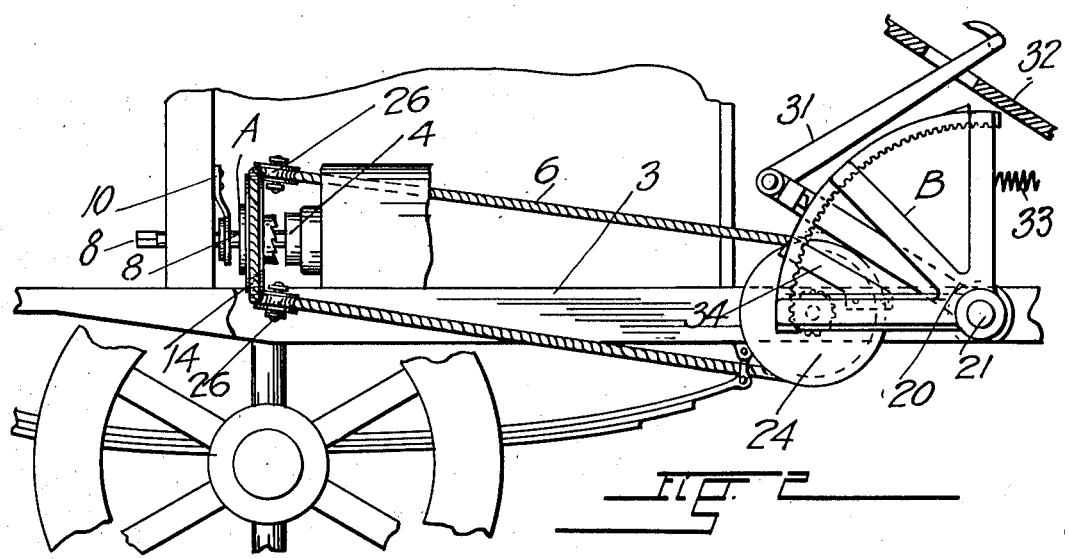
WITNESSES:
F. H. Cuno.
L. Rhodes.
INVENTOR.
E. V. Swern
BY
ATTORNEY.

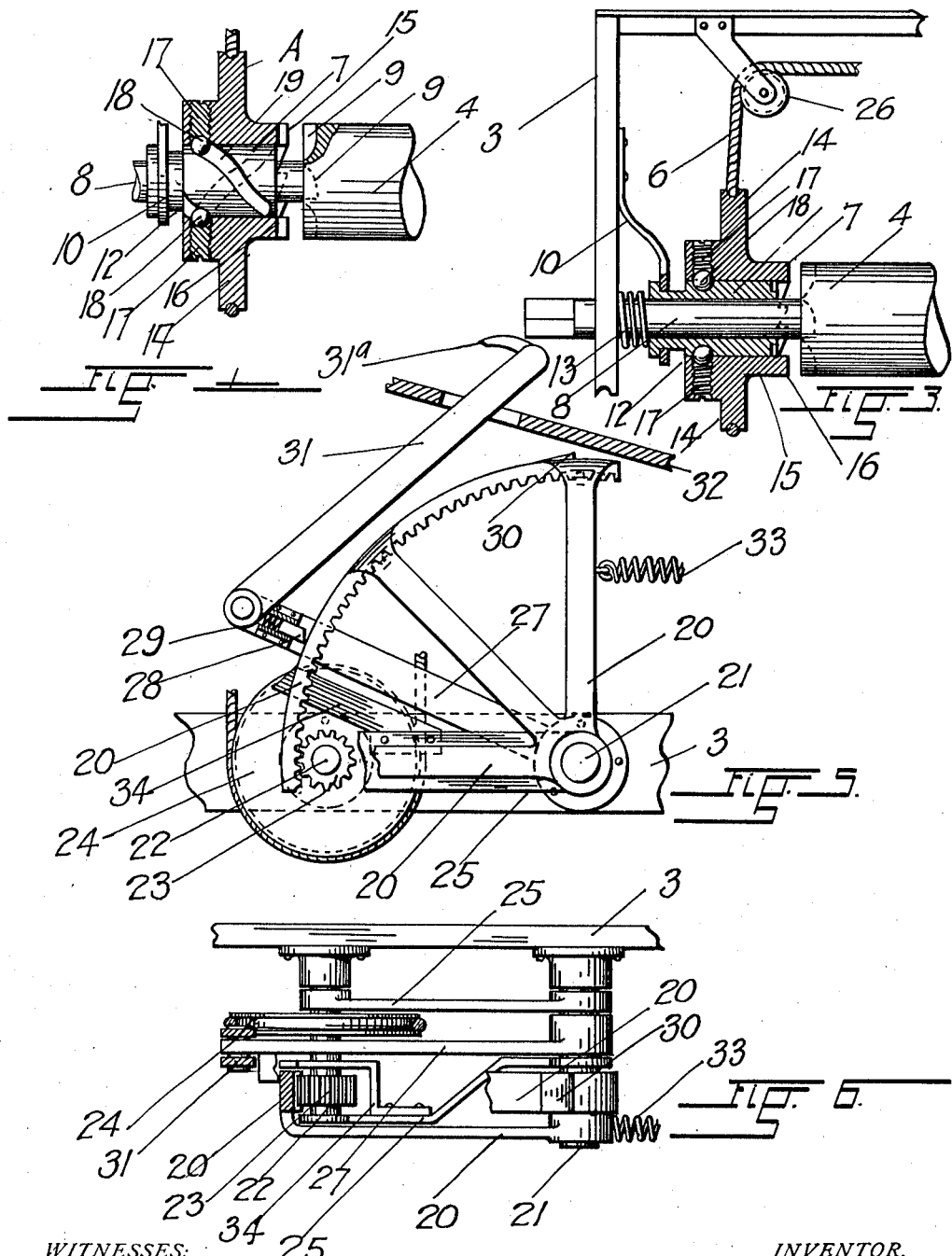

UNITED STATES PATENT OFFICE.

ERNEST V. SWERN, OF DENVER, COLORADO, ASSIGNOR OF ONE-FOURTH TO JOHN H. EAST, OF DENVER, COLORADO.

STARTING DEVICE FOR EXPLOSIVE-ENGINES.

1,026,374.  Specification of Letters Patent.  Patented May 14, 1912.

Application filed March 1, 1911. Serial No. 611,681.

*To all whom it may concern:*

Be it known that I, ERNEST V. SWERN, a citizen of the United States of America, residing at Denver, in the county of Denver and State of Colorado, have invented certain new and useful Improvements in Starting Devices for Explosive-Engines, of which the following is a specification.

This invention relates to a starting device for automobile motors and its object resides in the provision of a mechanism of simple construction by which the driver of an automobile may set its engine in motion by rotation of the crank-shaft, without being compelled to leave his seat in the vehicle.

In the accompanying drawings in the various views of which like parts are similarly designated, Figure 1, represents a fragmentary plan view of the chassis of an automobile with the starting device in its operative position, Fig. 2, a side elevation of the same, Figs. 3 and 4, sectional views of the clutch element comprised in the invention, Fig. 5, a side elevation of the operating element of the device, and Fig. 6, a sectional plan view of the same.

My improved starting apparatus comprises two elements one of which, designated in the drawings by the letter A, is installed at the front-end of the car 3, in operative association with the crank shaft 4 while the other element B is disposed in proximity to the front seat of the vehicle to be put in action by pressure of the foot of the person occupying the same. The two elements are operatively connected by a flexible member 6, such as a chain or rope, which serves to transmit the movement of the foot-actuated element, to a rotatory member of the other element, which is designed to interlock with the crank shaft and to impart a rotary movement thereto. The last mentioned element, which is best shown in Figs. 3 and 4 of the drawings, comprises a sleeve 7 which longitudinally movably surrounds the reduced end-portion 8 of the shaft 4 which in its end face, or the shoulder at the point where the said end portion begins, has a plurality of circularly arranged beveled notches 9 to receive the correspondingly formed teeth at the end of a clutch-member which is rotatably mounted upon the sleeve 7.

A bracket 10 secured at the forward end of the automobile, has at its lower extremity, a collar which occupies a circumferential groove 12 at the forward end of the sleeve 7, and inasmuch as the width of this groove exceeds that of the collar on the bracket 10, a limited longitudinal forward movement of the sleeve 7 and an adjacent surface of the crank-shaft is permitted, which movement, however, is resiliently opposed by a coiled spring 13 which surrounds the member 8 of the shaft, in engagement with the end of the sleeve 7 and an adjacent surface of the part of the automobile through which the said member projects.

The extremity of the member 8, projecting beyond the forward end of the car, is squared for the application of a crank when it is desired to set the engine in motion by the method at present commonly employed.

The clutch member above referred to consists of a sheave 14 the hub 15 of which extending at opposite sides thereof, has at its end opposite to the shoulder on the shaft 4, a plurality of teeth 16 which in number and form correspond with the beveled notches 9 in the shaft. The portion of the hub at the opposite side of the sheave has two diametrically opposite bores which are normally occupied by plugs 17, and which are provided for the introduction of balls 18 into spiral grooves 19 cut in the circumferential surface of the sleeve 7.

When by actuation of the operating element B, the construction of which will hereinafter be described, the sheave 14 is rotated, the balls 18 traveling in the grooves 19 of the sleeve 7, which is being held against rotation by contact with the bracket 10, will cause the sheave to advance in the direction of the shoulder on the shaft 4 until the teeth 16 are brought in engagement with the corresponding notches 9, when the continued rotary motion of the sheave is communicated to the shaft to set the motor with which it is associated, in action. Should this result be accomplished before the driver has ceased to actuate the operating element B, the spring 13 will permit a reciprocating movement of the member to allow the teeth 16 to slip out of the notches, until the parts have reassumed their normal position.

The operating element B which, as stated hereinbefore, is installed in proximity to the driver's seat of the vehicle, comprises an internally toothed segment 20 which is rotatably mounted upon a flanged stud 21 which is secured to the car body. A second stud 22 likewise fastened to the body of the car in parallel relation to the other, carries a pinion 23 which engages the teeth of the segment, and a sheave 24 which is rigidly connected with the pinion by a common hub. Links 25 are connected at their ends to the two studs for the purpose of maintaining them in their relative positions. The rotary motion of the sheave 24, is transmitted to the sheave 14 of the clutch element A by means of the before mentioned rope 6 which, being endless, runs over the respective sheaves and which by means of two guide-sheaves 26, rotatably mounted at the forward end of the chassis, is led in two directions, at right angles to each other.

A lever 27 which at one of its ends, is loosely mounted upon the stud 21, carries a pawl 28 which, by means of a spring 29, is held in constant engagement with the peripheral surface of the segment 20 and which is adapted to interlock with a detent 30 formed upon the peripheral surface of the segment, when the lever is moved about its axis of rotation, toward the highest point of the segment, at which the said detent is located when the parts are in their normal position of rest. An operating link 31 pivotally connected with the free end of the lever 27 extends through an opening in the floor 32 of the car body, to be within reach of the driver, and it has, at its upper extremity, a stop 31ª which by engagement with the said floor, limits the downward movement of the lever 27. A spring 33 attached at its opposite ends, to the segment and to a conveniently located part of the car-body serves to maintain the former in its normal position as illustrated in Fig. 5 of the drawings, and a stop 34 which extends upwardly from one of the links 25, has its beveled end disposed in the path of the pawl 28, to disengage it from the detent when the lever 27 has reached the end of its downward movement.

As the operation of my invention has been referred to at intervals, in the course of the foregoing description, it will only be necessary to describe it briefly at this point. When the driver of an automobile equipped with my improved apparatus, desires to set the engine in motion, he pulls with the toe of his shoe, the link 31 toward him until the pawl 28 on the lever 27 is interlocked with the detent 30 on the segment 20. He then, pushes the lever downwardly with the foot, to rotate the segment about the stud 21, which rotary movement is, through the instrumentality of the pinion 23, communicated to the sheave 24 and, by means of the flexible connection 6, to the sheave member 14 on the clutch element A, which, in consequence, is moved to interlock with the crank shaft 4 and subsequently impart a rotary motion to the same. When the lever 27 has reached the end of its downward movement, and the pawl has engaged the beveled end of the stop 34, the detent 30 is released and the segment 20 is returned to its original position by the action of the spring 33.

For clearness in illustration, the lever 27 has been shown in Fig. 5, in a position above that which it occupies when the parts are in their normal position and I wish it understood that while I have shown and described the apparatus in the best form at present known to me, variations in the construction and arrangement of its parts may be resorted to within the spirit of my invention.

What I claim and desire to secure by Letters-Patent is:—

1. A starting device for explosive engines comprising in combination with an engine shaft having an end portion of reduced diameter, a clutch member loosely mounted upon the said end portion, the said member and the shoulder on the shaft at the beginning of its reduced portion, having coöperative interlocking means, and means for converting a rotary movement of the said member into a simultaneous movement of the same toward the said shoulder, whereby the said interlocking means are brought into operative engagement.

2. A starting device for explosive engines, comprising in combination with an engine shaft, a sleeve mounted in axial alinement therewith and having an external spiral groove, and a clutch-member loosely mounted upon the said sleeve and having a projection within the said groove whereby a rotary movement of the said member is converted into a simultaneous longitudinal movement of the same with relation to the said sleeve, the said member and the said shaft having opposite, normally separated, coöperative interlocking means.

3. A starting device for explosive engines, comprising in combination with an engine shaft, a sleeve mounted in axial alinement therewith, and having an external spiral groove, a clutch-member loosely mounted upon the said sleeve and having a projection within the said groove, whereby a rotary movement of the said member is converted into a simultaneous longitudinal movement of the same in one direction with relation to the said sleeve, and a spring between the said sleeve and a relatively stationary surface to resiliently oppose its movement with the said member in the opposite direction, the said member and the said shaft having opposite, normally separated, coöperative interlocking means.

4. A starting device for explosive engines, comprising in combination with an engine shaft, a sleeve mounted in axial alinement therewith and having an external spiral groove, a clutch member loosely mounted upon the said sleeve, and a ball carried on the said member, within the said groove, whereby a rotary movement of the said member is converted into simultaneous longitudinal motion of the same with relation to the said sleeve, the said member and the said shaft having opposite, normally separated interlocking means.

5. A starting device for explosive engines comprising in combination with an engine shaft having an end portion of reduced diameter, a sleeve mounted upon the said end portion and having an external, spiral groove, and a clutch member loosely mounted upon the said sleeve and having a projection within the said groove, whereby a rotary movement of the said member is converted into a simultaneous longitudinal movement of the same with relation to the sleeve, the said member and the shoulder on the shaft surrounding its reduced portion having normally separated, coöperative interlocking means.

6. A starting device for explosive engines comprising in combination with an engine shaft having an end portion of reduced diameter, a sleeve mounted upon the said end portion and having an external, spiral groove, and a clutch-member loosely mounted upon the said sleeve and having a projection within the said groove, whereby a rotary movement of the said member is converted into a simultaneous longitudinal movement of the same with relation to the sleeve, the said member and the shoulder on the shaft surrounding its reduced portion, having normally separated, coöperative interlocking means, and a spring surrounding the end portion of the shaft between the said sleeve and a relatively stationary surface.

7. A starting device for explosive engines comprising in combination with the engine-shaft, a clutch-member mounted to move about and along an axis alined with that of the shaft, the said member and the said shaft having opposite normally separated, coöperative interlocking means, means for converting a rotary movement of the said member into a simultaneous displacement of the same in the direction of its axis whereby the said interlocking means are brought into operative engagement, an operating element remote from the said shaft, and a transmission element for converting a movement of the said operating element into a rotary movement of the said clutch member.

8. A starting device for explosive engines comprising in combination with the engine-shaft, a clutch-member mounted to move about and along an axis alined with that of the shaft, the said member and the said shaft having opposite, normally separated, coöperative interlocking means, means for converting a rotary movement of the said member into a simultaneous displacement of the same in the direction of its axis whereby the said interlocking means are brought into operative engagement, a rotary gear, means for transmitting the movement of the said gear to the said clutch-member, a rotary segment in operative engagement with said gear, and a means for moving said segment about its axis of rotation.

9. A starting device for explosive engines comprising in combination with the engine-shaft, a clutch-member mounted to move about and along an axis alined with that of the shaft, the said member and the said shaft having opposite normally separated, coöperative interlocking means, means for converting a rotary movement of the said member into a simultaneous displacement of the same in the direction of its axis whereby the said interlocking means are brought into operative engagement, a rotary gear, means for transmitting the movement of the said gear to the said clutch-member, a rotary segment in operative engagement with said gear, a spring resiliently maintaining said segment in its normal position, and means for moving said segment against the action of the said spring.

10. A starting device for explosive engines comprising in combination with the engine-shaft, a clutch member mounted to move about and along an axis alined with that of the shaft, the said member and the said shaft having opposite, normally separated, coöperative interlocking means, means for converting a rotary movement of the said member into a simultaneous displacement of the same in the direction of its axis whereby the said interlocking means are brought into operative engagement, a rotary gear, means for transmitting the movement of the said gear to the said clutch-member, a rotary segment in operative engagement with said gear, a lever independently movable about an axis coincident with that of the segment, a pawl on the said lever adapted to interlock with a detent on the segment, means for disconnecting the pawl from the said detent, and a means to yieldingly oppose the movement of the segment with the said lever.

11. A starting device for explosive engines comprising in combination with the engine-shaft, a clutch member mounted to move about and along an axis alined with that of the shaft, the said member and the said shaft having opposite normally separated, coöperative interlocking means, means for converting a rotary movement of the said member into a simultaneous displacement of the same in the direction of its axis whereby the said interlocking means are brought into operative engagement, a rotary gear, means for transmitting the movement of the said gear to the said clutch-member, a rotary segment in operative engagement with said gear, a lever independently movable about an axis coincident with that of the segment, coöperative means on the said lever and the segment to automatically connect one with the other at a determinate point in the movement of the lever, means for breaking said connection at another determined point in the movement of the lever, and a means to yieldingly oppose the movement of the segment with the said lever.

12. A starting device for explosive engines comprising in combination with the engine shaft, a clutch member mounted to move about and along an axis alined with that of the shaft, and including a sheave, the said member and the said shaft having opposite, normally separated, coöperative interlocking means, means for converting a rotary movement of the said sheave into a simultaneous movement of the said member along its axis whereby the said interlocking means are brought in operative engagement, a rotary sheave remote from the said shaft, means for rotating the last mentioned sheave and a rope for transmitting the movement of the same to that on the clutch-member.

In testimony whereof I have affixed my signature in presence of two witnesses.

ERNEST V. SWERN.

Witnesses:
L. RHOADES,
G. J. ROLLANDET.